United States Patent [19]

Naughton

[11] Patent Number: 5,395,017

[45] Date of Patent: Mar. 7, 1995

[54] CANTILEVERED CARRIER RACK FOR BICYCLE

[76] Inventor: Gary B. Naughton, 2277 Dunstan St., Oceanside, Calif. 92054

[21] Appl. No.: 104,428

[22] Filed: Aug. 9, 1993

Related U.S. Application Data

[63] Continuation-in-part of Ser. No. 868,518, Apr. 15, 1992, abandoned, which is a continuation-in-part of Ser. No. 595,589, Oct. 11, 1990, Pat. No. 5,135,143.

[51] Int. Cl.⁶ .............................................. B62J 11/00
[52] U.S. Cl. .................................... 224/39; 224/30 R
[58] Field of Search ...................... 224/31, 32 R, 32 A, 224/33 R, 39, 40, 42, 42.01, 151

[56] References Cited

U.S. PATENT DOCUMENTS 5,127,563  7/1992  Chan et al. ............................ 224/39
5,190,345  3/1993  Lin ..................................... 224/39 X

*Primary Examiner*—Robert M. Fetsuga
*Attorney, Agent, or Firm*—John R. Ross

[57] ABSTRACT

A carrier rack for easy attachment to and removal from a standard bicycle seat. The carrier includes a support which in use extends over the rear wheel of the bicycle. A seat post abutment fork located at the front end of the support is configured to at least partially encircle and abut the seat post just under the enlarged portion of the seat post. A rail hanger is attached to the support and extends upward from the support at a location forward of the center of gravity of the support. In a preferred embodiment arms of the rail hanger extend over the saddle rails of a standard bicycle seat at a pivot position near the knees of the rails so as to support the weight of the rack and its burden in a hanging fashion with the seat post abutment fork partially encircling the seat post. The center of gravity of the carrier being rearward of the hanger causes a torque action about the pivot position so as to apply a forward force by the seat post abutment fork against the seat post just below the enlarged portion of the seat post and an upward force against the underside of the enlarged portion of the seat post.

8 Claims, 6 Drawing Sheets

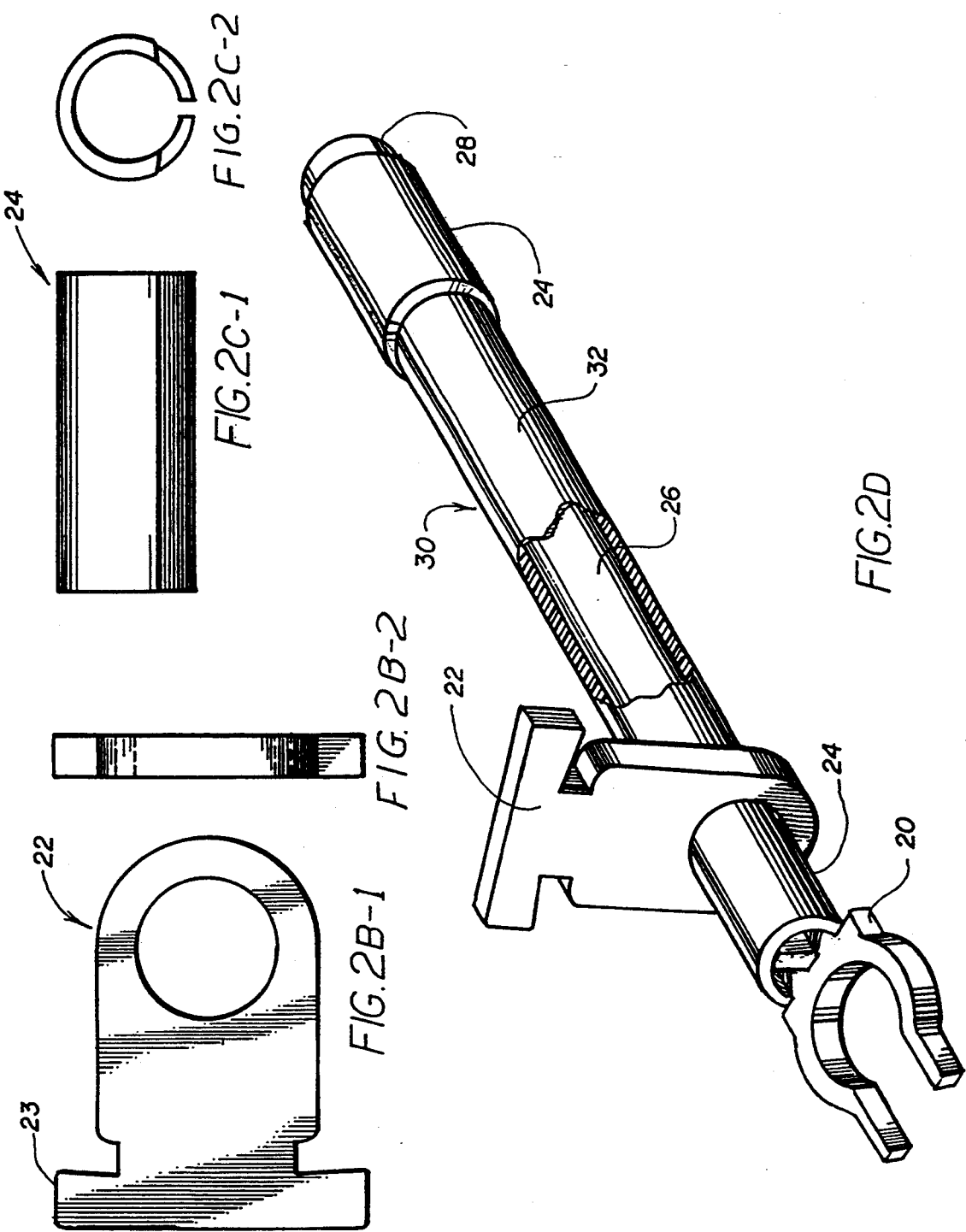

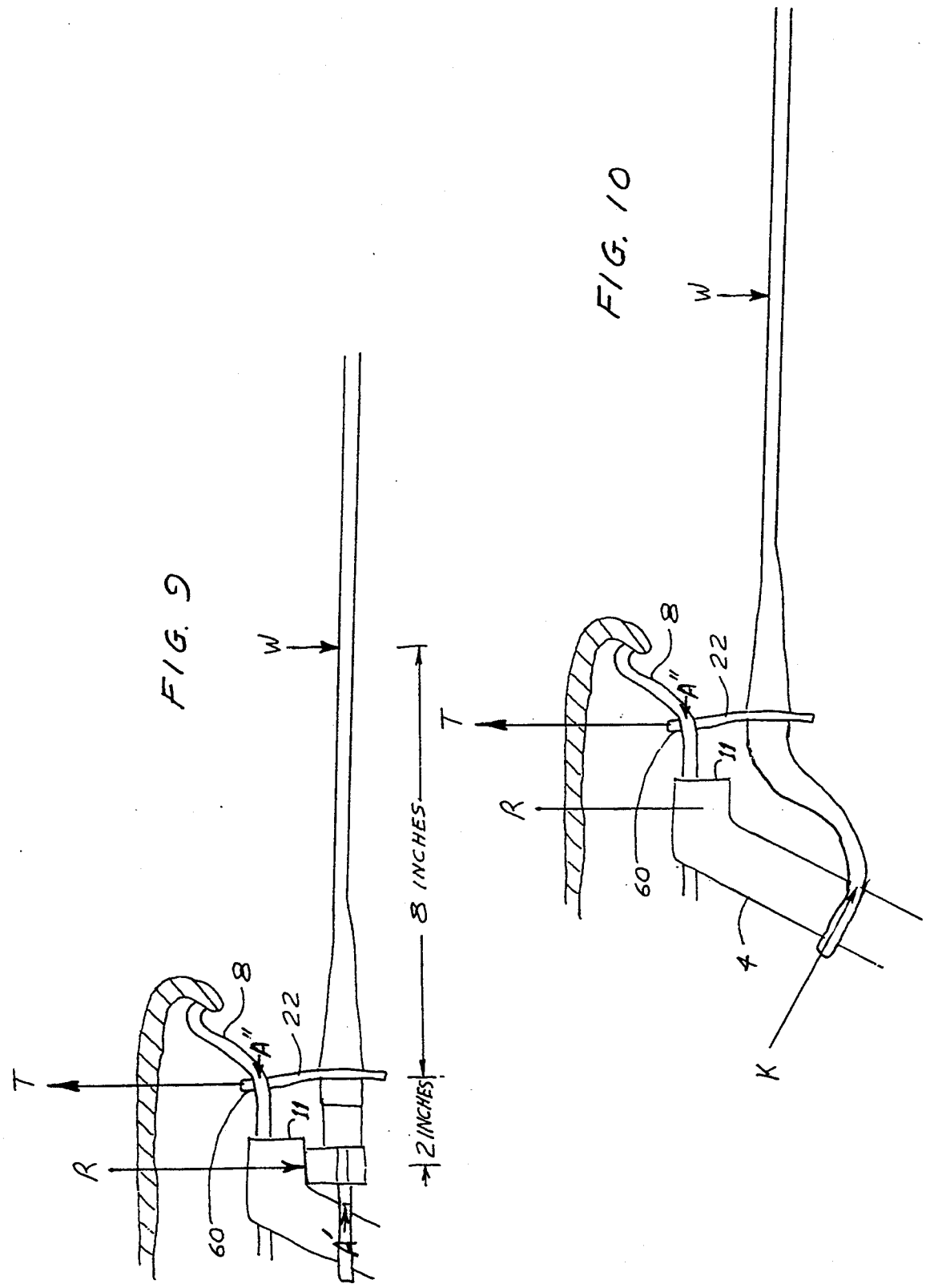

CANTILEVERED CARRIER RACK FOR BICYCLE

This is a continuation in part of Ser. No. 07/868,518, filed on Apr. 15, 1992, abandoned, which was a continuation in part of Ser. No. 07/595,589, filed on Oct. 11, 1990, (now U.S. Pat. No. 5,135,193). This invention relates to bicycle accessories and in particular to article carriers for bicycles.

BACKGROUND OF THE INVENTION

Bicycle seats have changed very little during the last 50 years. Most bicycles have a seat post that telescopes up and down inside an angled portion of the bicycle frame known as the seat tube. At the top of the seat post is a clamping device which allows saddles of various designs to be positioned essentially horizontally with the rearward portion of the seat forming an obtuse angle with the seat post.

My estimate is that roughly 90 percent of the bicycles in the United States are of the railed saddle type. They have the general features shown in FIGS. 1A, 1B and 1C. These features are a cushion 2, a seat post 4 which is typically enlarged near its top, a seat mount boss 6, two saddle rails 8 formed of a single metal bar typically made of spring steel bent into the shape shown in the three figures with both ends of the bar at the front of the saddle. Seat mount boss 6 is used to attach the saddle to the seat post by clamping the two rails. Many saddles are attached to seat post 4 by vertical bolt 10 as shown in FIG. 1A through seat mount 6. In other saddle systems the bolt passes through the boss horizontally. In the vicinity of the seat post and seat mount boss 6, the rails are typically about 1½ inches apart and parallel to each other so that the seat can be adjusted forward and backward by loosening bolt 10, moving the saddle and then tightening bolt 10. As shown in FIG. 1C the two rails spread apart toward the cantle (i.e., rear) of the saddle so that where the rails meet the cushion 2 they are separated by about 2¼ inches. The vertical distance between the parallel area and the widest separation near the cushion is about 1½ inches. At the point where the rails begin to separate a knee in defined as indicated at 12 in FIG. 1A. The distance between knee 12 and the corner 14 formed at the rear of the uppermost portion of the straight portion of seat post 4 is variable between about 1 inch to about 3 inches depending of how the saddle is adjusted in the forward-backward direction, but that distance is typically about 2½ inches.

It is common practice for bicyclists to attach a saddle bag to the back portion of such a saddle and seat post. Two examples are the Goldman patent, U.S. Pat. No. 4,643,343 and the Chan patent U.S. Pat. No. 5,127,563. In Goldman a bracket with a slot is bolted to the rails and one end of a support arm slides through the slot to rest under the seat cover and a bag is supported in a cantilevered fashion by by belting it about the seat post. In Chan a cleat is used to hang an article from the saddle rails and a clip is snapped on the seat post to hold the article in place.

In Smith, U.S. Pat. No. 4,948,020, a carrier frame is held over the back wheel by a cantilever bar bolted to the seat post.

SUMMARY OF THE INVENTION

The present invention provides a carrier rack for easy attachment to and removal from a standard bicycle seat. The carrier includes a support which in use extends over the rear wheel of the bicycle. A seat post abutment fork located at the front end of the support is configured to at least partially encircle and abut a standard bicycle seat post just under the enlarged portion of the seat post. A rail hanger is attached to the support and extends upward from the support at a location forward of the center of gravity of the support. In a preferred embodiment arms of the rail hanger extend over the rails of the bicycle seat at a pivot position near the knees of the saddle mils so as to support the weight of the rack and its burden in a hanging fashion with the seat post abutment fork partially encircling the seat post. The center of gravity of the carrier being rearward of the hanger causes a torque action about the pivot position so as to apply a forward force by the seat post abutment fork against the seat post just below the enlarged portion of the seat post and an upward force against the underside of the enlarged portion of the seat post, The carrier is held in place by (1) the arms of the rail hanger extending over the rails, (2) by the downward reaction force imposed by the enlarged portion of the seat post, (3) a rearward reaction force by the seat post against the seat post abutment fork, (4) a countering forward reaction force applied by the saddle rails rearward of the knees and (5) by the weight of the carrier itself and its burden (if any). In another embodiment the seat post fork abuts the seat post significantly below the enlarged portion of the post but at least a few inches below the pivot position so as to assure that substantially all of the torque action is in an approximately horizontal direction against the seat post.

BRIEF DESCRIPTION OF THE DRAWINGS

FIG. 2D is a perspective view of the preferred embodiment referred to above.

FIGS. 9 and 10 are drawings showing the forces acting on a preferred embodiments in use, which forces hold the preferred embodiment in place on the bicycle.

DETAILED DESCRIPTION OF PREFERRED EMBODIMENTS

Figure 1A:
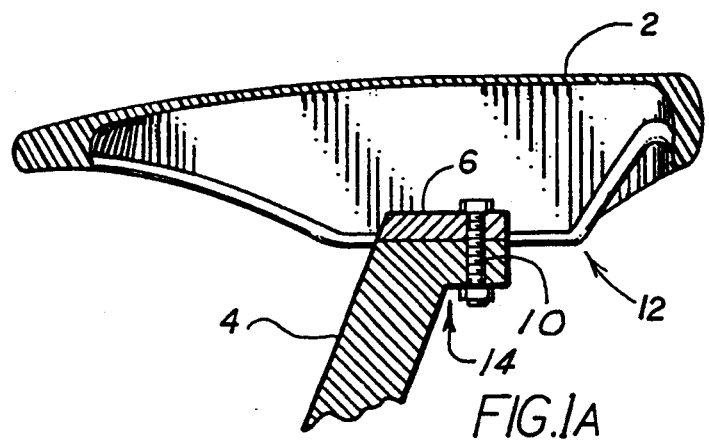
FIGS. 1A, B, and C are three views of a standard railed saddle.
Figure 1B:
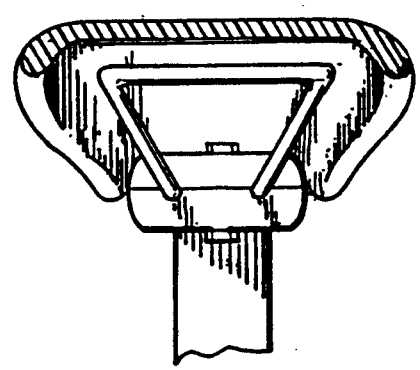
Figure 1C:
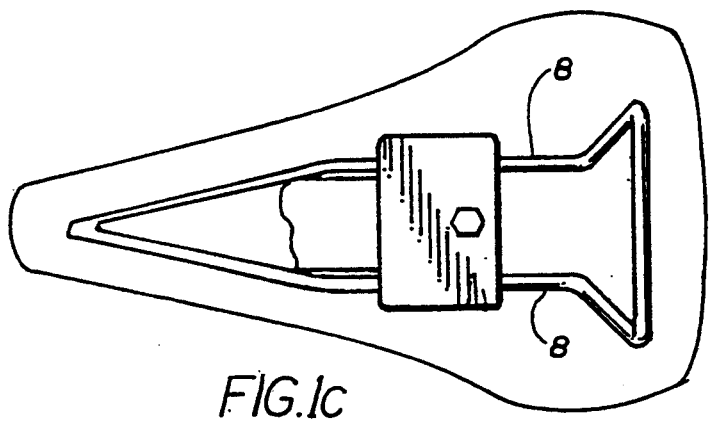
Figures 1, 2A:
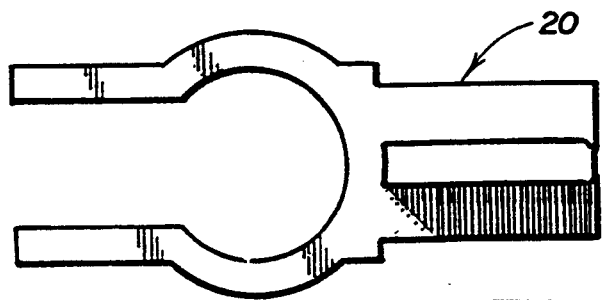
FIGS. 2A, B, and C are views of parts of a preferred embodiment of the present invention.
Figures 2, 2A:
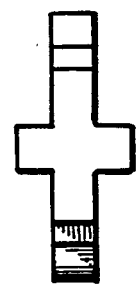

A preferred embodiment of the present invention suitable for carrying a wide variety of articles can be described by reference to FIGS. 2A, 2B, 2C and 2D. FIG. 2A is a drawing of the top and rear views of a seat post fork. It is injection molded into the shape shown from Dupont nylon Model No. ST-801. FIG. 2B is a drawing of the side and bottom views of a rail hanger for this embodiment. It is also molded into the shape from the same Dupont nylon. FIG. 2C is a drawing of a finger spacer which is 1⅜ inches in length. An assembly drawing of this embodiment is shown in FIG. 2D. It consists of a support bar 30 made up of a 12 inch section of ¾ inch PVC pipe 32 with a 10 inch by ⅜ inch diameter hardwood dowel inserted in the front end from 1 inch position to the 11 inch position shown with two finger supports at both ends as shown. Seat post fork 20 is inserted in the front end of the pipe as shown and is held in place by a small screw (not shown). (Generically I sometimes call the seat post fork as an abutting means.) Hanger 22 is fitted onto support bar 30 prior to installing the forks and is held in place by a small screw (not shown). A handle bar cap plug 28 is installed at the rear end to make a smooth finish of the carrier.

Figure 3A:
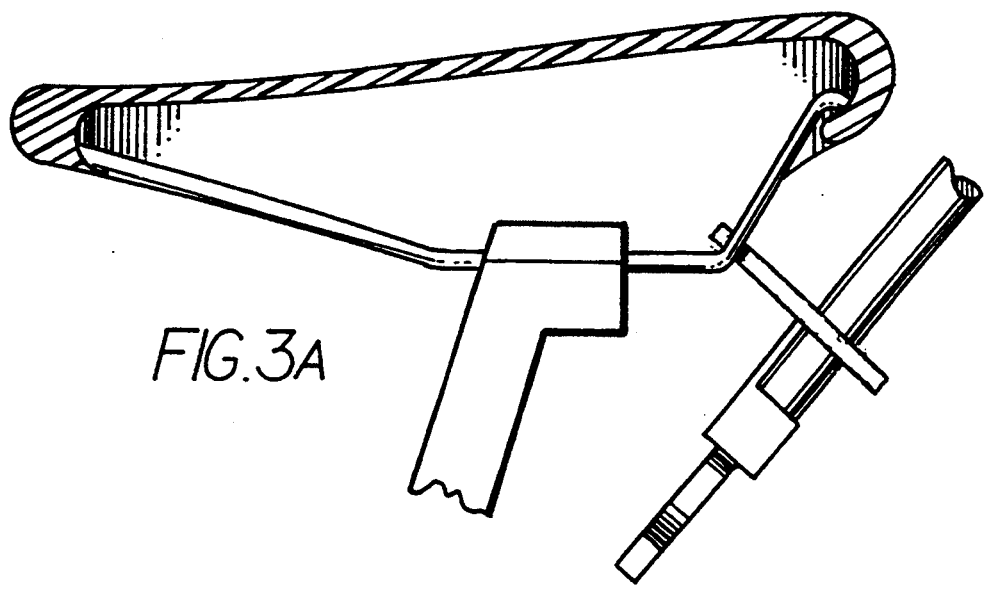
FIGS. 3A and B show how the embodiment is installed on the saddle shown in FIGS. 1A, B and C.
Figure 3B:
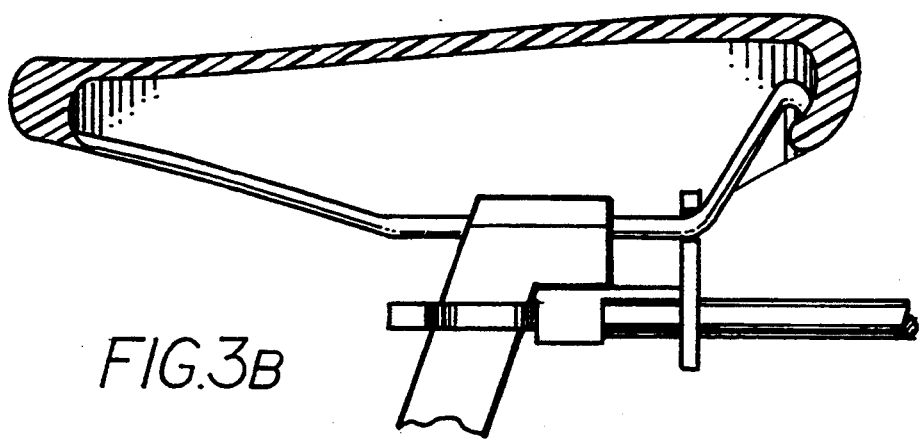
FIGS. 3C and D show views of the embodiment in place on a bicycle.
Figure 3D:
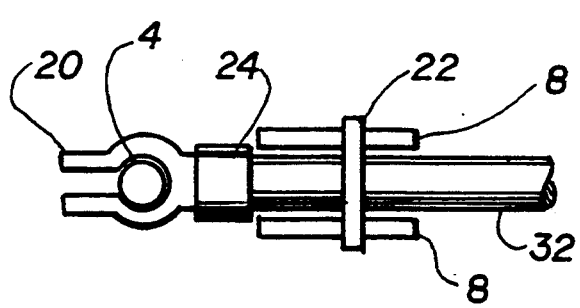
Figure 3C:
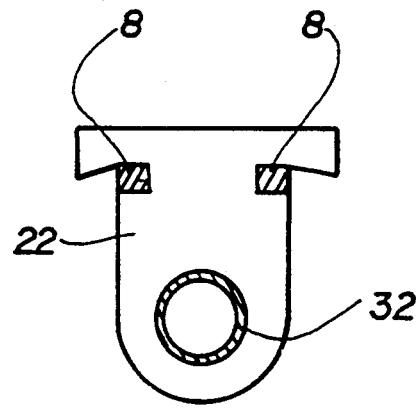

The carrier is installed on a bicycle as shown in FIGS. 3A and 3B. To install the carrier on a bicycle, the hanger is inserted over the rails where the rails are further apart. The hanger is then adjusted so that its plane is approximately perpendicular to the direction of the rails so that the slot just below arms 23 is between the rails as shown in FIG. 3A. The hanger is then slid forward while the seat post fork is raised until the seat post fork partially encircles the seat post just below the enlarged section of the seat post and the hanger arms are positioned over the rails in the parallel section of the rails just in front of the knees of the rails as shown in FIG. 3B. FIG. 3C is a rear view of a cross section showing the position of the rails 8 with respect to the hanger when this embodiment is installed on the bicycle, and FIG. 3D shows a top view.

For best results, the horizontal space between (i) the point of contact of the seat post fork with the seat post and (ii) the knees of the rail should be about ⅛ inch less than the horizontal distance between (i) the abutting point of the fork and (ii) the rear portion of the arms of the hanger. When this is the case, a load on the carrier will apply a torque to the carrier which will cause rearward horizontal reaction force by the seat post against the fork which will cause the arms of the hanger to be pressed against the rising portion of the rails just behind the knees of the rails. As a result the hanger will be very slightly bent forward to maintain a constant force against both the seat post and the rising portion of the rails. This is explained further in the following section.

The Physics of the Carrier

The physics of the present invention may be described qualitatively with the help of FIGS. 9 and 10. In FIG. 9 arrows identified by the letters W, T, R and A represent the forces acting on one preferred embodiment of the carrier. W represents a load carried on the carrier. (The weight of the carrier itself is neglected in this example.) The carrier and its load is supported by the arms 23 of hanger 22 which transfers the weight of the carrier and its burden and other forces to the saddle rails 8 at pivot point 60. W creates a clockwise torque about pivot point 60. This torque is countered primarily by a vertical downward force R exerted by the enlarged portion 11 of seat post 4. To a much lesser extent, the torque is countered by reaction force A' by the seat post against to seat post fork in the backward direction. This force A' is then countered by a forward force A" from the knees of rails 8 acting on arms 23 of hanger 22 as shown in FIG. 9. As stated above, the horizontal space between the seat post and the knees of the rails should be about ⅛ inch too short for the section of the carrier between the abutting point of the seat post fork and the back part of the hanger arms. The effect is to compress the carrier between the arms and the seat post fork and to hold it firmly in place on the bicycle. Downward forces W and R are opposed by upward force T. Thus, for a weight W of about 5 pounds, R would be roughly 20 pounds and T would be about 25 pounds. With the saddle adjusted properly the A forces are about 0.5 pounds to 2 pounds.

Hanger 22 should be located at least 5 inches forward of the center of gravity of the carrier. As shown in FIG. 10 a preferred arrangement is for the hanger 22 to be located 2 inches behind the point of abutment with the seat post. However, this distance could range between 1 inch and 3 inches with no problem.

With the carrier carrying no burden we have only the weight of the carrier itself to provide the needed torque to keep the carrier in place on the rack. In this case the acting forces will be much less. The carrier may ride in a slightly tilted position and the bend in hanger 22 will be smaller.

FIG. 10 shows the forces applicable with respect to another embodiment where the fork is positioned to abut the seat post about 4 inches below the position 60 of rotation on the seat rails. In this case the torque created by W is resisted by a diagonal force K which has both verticle-downward and horizontal-backward components. The horizontal-backward component is countered as above by a forward force A" acting on arms 23. So the net effect is similar to the embodiment shown in FIG. 9.

Out Rack

Figure 4A:
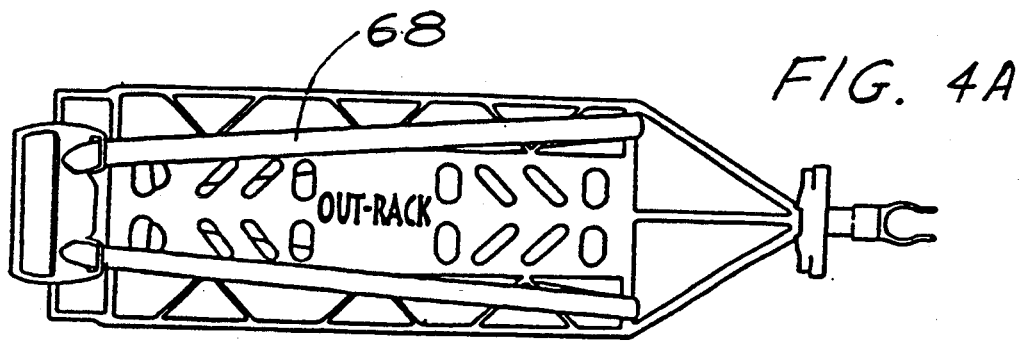
FIGS. 4A, 4B and 4C show views of my "Out Rack" embodiment.
Figure 4B:
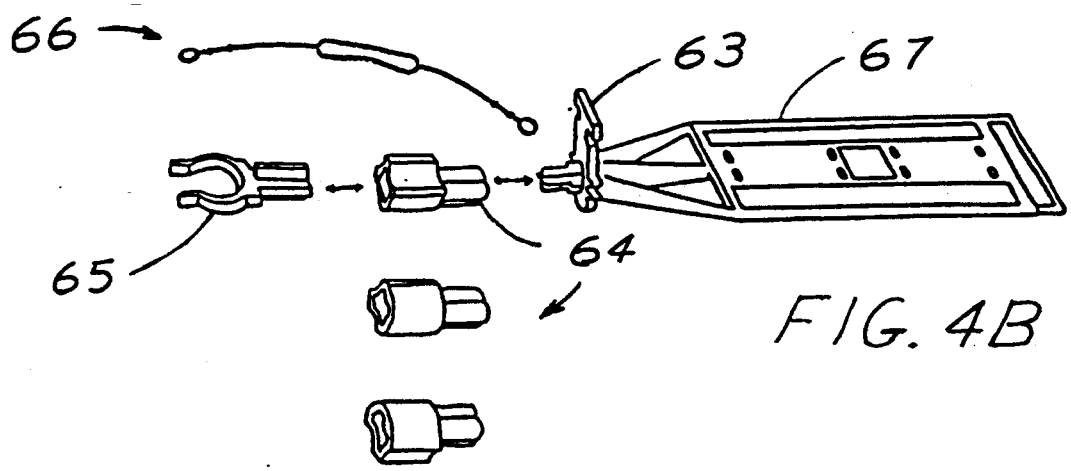

Shown in FIG. 4A is a sketch of a preferred embodiment of the present invention for carrying miscellaneous articles. The rack is shown installed on the back of a bicycle in FIG. 4C. This embodiment is fabricated from 6 parts: the platform 67, hanger piece 63, shim coupling 64, post fork 65, and retaining strap 66. The retainer strap is extra insurance that the seat post fork will not bounce loose from the seat post when riding over rough terrain. Note that shim piece 64 fits on the front end of the rack 62 in either of four positions, each presenting a different dimension in the upper direction. (Three of these four positions are shown in FIG. 4B.) This permits the user to pick the position which will provide the best fit to his particular bicycle (the shim fitting under the enlarged portion of the seat post) so that the carder will be most level with the ground surface. This embodiment also comes with elastic straps 68 to tie down articles on the carrier. This model is injection molded from "Super Tough" nylon and glass composite nylons. This embodiment has shown excellent success in the market place since introduction in October, 1992.

Easier Installation

In the embodiment shown in FIGS. 2A, B and C, the distance between the ends of arms 23 is longer than the space between rails 22 even at their widest separation. This is to assure that it is virtually impossible for the carrier to fall off the bicycle even if the platform was to lose its contact with the seat post and twist sideways. If the distance between the arms is made shorter it is a little easier to install but the chance of its falling off may be a little greater.

Attachment for Cruiser or Other Saddles

Figure 6:
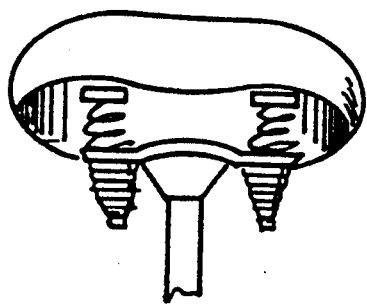
FIG. 6 shows the rear view of a cruiser saddle.
Figure 7:
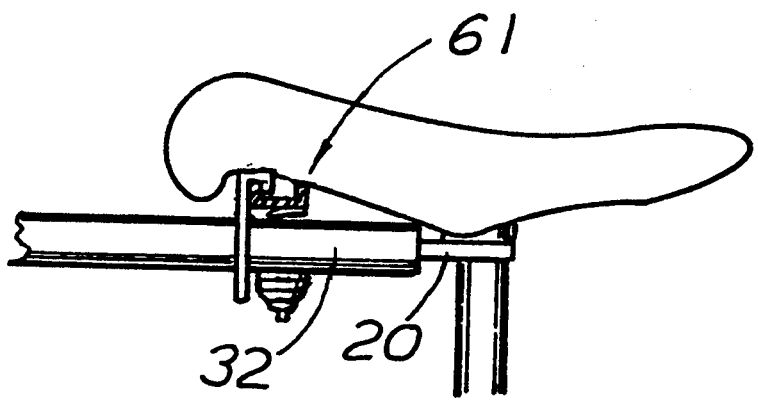
FIG. 7 shows an embodiment of the present invention installed on the cruiser saddle.
Figure 8:
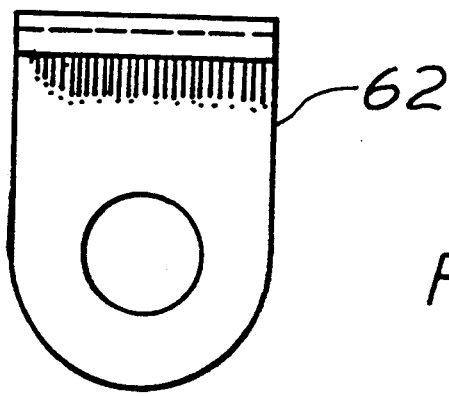
FIG. 8 is a front view of the hanging element of the embodiment shown in FIG. 7.

FIG. 6 shows the rear view of a cruiser saddle. This saddle typically includes a steel brace 61 which is basically "U" shaped as shown in cross section in FIG. 7. A front view of the hanger 62 for this type of saddle is shown in FIG. 8. The article carrier is shown installed on a cruiser saddle in FIG. 7. Hanger 62 hangs over brace 61 and seat post fork 20 and support bar 32 are the same as shown in FIG. 2D. Since cruiser saddles typically have no forward adjustment it is important that hanger 62 be able to slide along support bar 32. Once it is properly located for a particular seat it should be fixed into that position by a screw, glue or other such means.

Other Embodiments

As will be apparent to those skilled in the art in the light of the foregoing disclosure, many alternations and modifications are possible in the practice of this invention without departing from the spirit or scope thereof. It should be noted that the design of the present invention provides a natural springy action which cushions against shock. This fact makes the present invention especially useful in situations where lack of shock is important such as for carrying optical or electronic devices like camcorders. Since the carrier has no down stays, a suit bag can be wrapped around the carrier so that business executives can bike to work and carry their suits unwrinkled on the back of their bicycles.

There are obviously many other possible designs of the seat post fork. By partially encircling the seat post it keeps the carrier from rotating in the horizontal direction. It also enables the seat post to exert a downward and backward reaction force against the carrier countering the torque produced by the weight of the carrier and any load being carried acting at the combined center of gravity of the carrier and any such load.

Figure 4C:
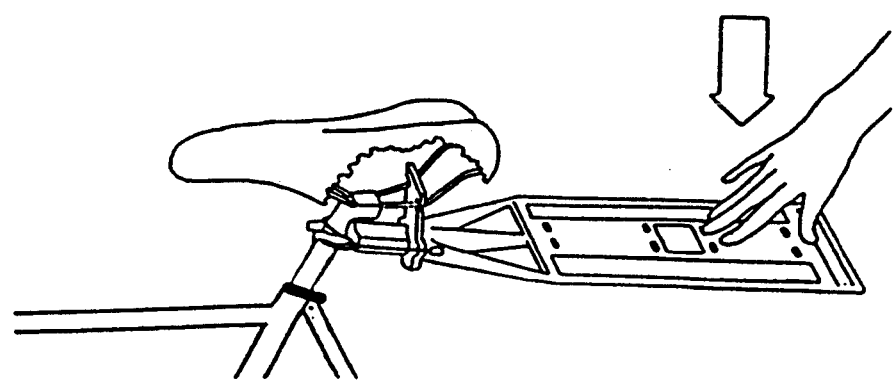
Figure 5A:
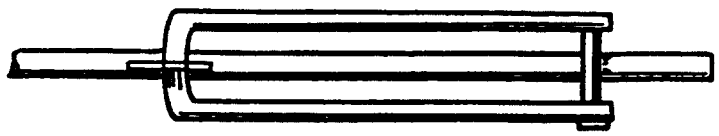
FIGS. 5A and 5B show a lock carried on the embodiment shown in FIG. 2D.
Figure 5B:
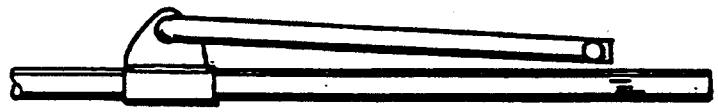

The downward force keeps the carrier level and the backward force forces the hanger arms against the seat rails just rearward of the knees of the rails which prevents the carrier from moving forward or backward while in use on the bicycle. To satisfy its function it could abut the seat post just below an enlarged portion or just below the wider lower section of the seat as shown in FIGS. 3B and FIG. 4C. Alternately, the seat post fork could abut the seat post significantly below the enlarged portion of the post so long as it does so at least a few inches below the position of rotation on the seat rails. This assures that the torque generated by the weight of the carrier and its load, if any, acting at the combined center of gravity is translated into a substantially horizontal force against the seat post.

Accordingly, the scope of the invention is to be construed in accordance with the substance defined by the following claims.

I claim:

1. An article carrier-bicycle seat combination for carrying articles on a bicycle having front and back wheels and a seat post with an enlarged portion at its top, said carrier-bicycle seat combination comprising:
   (a) a bicycle seat mounted on said seat post and having a seat support frame comprising two rails bent to define two knees,
   (b) a rigid support means having a length of at least 10 inches and defining a carrier location, a front end, a rear end and a center of gravity located between said front end and said rear end, for supporting articles over the back wheel of said bicycle,
   (c) a seat post abutting means firmly attached at the front end of said support means configured to abut and at least partially encircle said seat post,
   (d) a seat hanger means comprising two extension arms, each arm configured to extend over one of said two rails, said seat hanger means being attached to said support means at a location at least 5 inches forward of said center of gravity and forward of said carrying location,
   said carrier being easily attachable to said bicycle by inserting said extension arms over said mils at a position just in front of said knees, said position just in front of said knees defining a pivot position, and abutting said seat post abutting means against and at least partially encircling said seat post,
   said carrier being constructed so that it will, when so attached, be held in place on said bicycle by (i) a downward and rearward reaction force exerted by said seat post, said downward and rearward reaction force countering a torque about said pivot position produced by a vertically acting downward force resulting from gravity acting on the mass of the carrier and any article being carried by said carrier, (iii) a forward reaction force countering said rearward reaction force exerted by said mils rearward of said knees and (iv) a upward force exerted by said rails on the arms of said hanger means countering the weight of said carrier and article and the downward force exerted by said seat post.

2. An article carrier as in claim 1 wherein the length of said support means is about 19 inches.

3. An article carrier as in claim 1 wherein the distance between the ends of said two extension arms is about 2¼ inches.

4. An article carrier as in claim 1 wherein said hanger means comprises a notch below each arm and the distance between said notches is about 1 5/16 inches.

5. An article carrier-bicycle seat combination for carrying articles on a bicycle having front and back wheels and a seat post with and enlarged portion at its top, said carrier comprising:
   (a) a bicycle seat mounted on said seat post and having a seat support frame comprising two rails bent to define two knees,
   (b) a support means having a length of at least 10 inches and defining a carrying location, a front end, a rear end and a center of gravity located between said front end and said rear end, for supporting articles over the back wheel of said bicycle,
   (c) a seat post abutting means firmly attached at the front end of said support means configured to abut and at least partially encircle said seat post just under said enlarged portion of said seat post,
   (d) a seat hanger means comprising two extension arms each arm configured to extend over one of said two rails, said seat hanger means being attached to said support means at a location between 1 inch and 3 inches from the abutting point of said seat post abutting means and at least 5 inches forward of said center of gravity and forward of said carrying location,
   said carrier being easily attachable to said bicycle by inserting said extension arms over said mils at a position just in front of said knees, said position just in front of said knees defining a pivot position, and abutting said seat post abutting means against and at least partially encircling said seat post,
   said carrier being constructed so that it will, when so attached, be held in place on said bicycle by (i) a downward reaction force exerted by said enlarged portion of said seat post, (ii) a marward reaction force exerted by said seat post, said downward and rearward reaction forces countering a torque about said pivot position produced by a vertically acting downward force resulting from gravity acting on the mass of the carrier and any article being carried by said carrier, (iii) a forward reaction force countering said rearward reaction force exerted by said rails rearward of said knees and (iv) a upward force exerted by said rails on the arms of said hanger means countering the weight of said carrier and article and the downward force exerted by said enlarged portion of said seat post.

6. An article carrier as in claim 5 wherein the distance between the ends of said two extension arms is about 2¼ inches.

7. An article carrier as in claim 5 wherein said hanger means comprises a notch below each arm and the distance between said notches is about 1 5/16 inches.

8. An article carrier as in claim 5 and further comprising a removable shim means for adjusting the angular position of said carrier relative to a surface on which said bicycle is located.

* * * * *